(12) United States Patent
Runger et al.

(10) Patent No.: US 9,395,033 B2
(45) Date of Patent: Jul. 19, 2016

(54) PROJECTOR MOUNT SYSTEM AND METHOD

(71) Applicant: Ergotron Inc., St. Paul, MN (US)

(72) Inventors: George Runger, Eagan, MN (US); Robert W. Fluhrer, Prior Lake, MN (US)

(73) Assignee: Ergotron, Inc., St. Paul, MN (US)

( * ) Notice: Subject to any disclaimer, the term of this patent is extended or adjusted under 35 U.S.C. 154(b) by 69 days.

(21) Appl. No.: 14/208,177

(22) Filed: Mar. 13, 2014

(65) Prior Publication Data

US 2014/0299738 A1 Oct. 9, 2014

Related U.S. Application Data

(60) Provisional application No. 61/778,712, filed on Mar. 13, 2013, provisional application No. 61/840,077, filed on Jun. 27, 2013.

(51) Int. Cl.
| | |
|---|---|
| *F21V 21/00* | (2006.01) |
| *F16M 11/12* | (2006.01) |
| *F16M 11/14* | (2006.01) |
| *F16M 13/02* | (2006.01) |

(Continued)

(52) U.S. Cl.
CPC ............. *F16M 11/12* (2013.01); *F16M 11/123* (2013.01); *F16M 11/125* (2013.01); *F16M 11/14* (2013.01); *F16M 13/027* (2013.01); *E04B 9/006* (2013.01); *F21V 21/00* (2013.01); *F21V 21/03* (2013.01)

(58) Field of Classification Search
USPC ......... 248/317, 323, 324, 326, 327, 333, 343; 52/220.6
See application file for complete search history.

(56) References Cited

U.S. PATENT DOCUMENTS

| | | | | |
|---|---|---|---|---|
| 2,643,844 | A | | 6/1953 | Nette |
| 3,516,628 | A | * | 6/1970 | Kendall .................... F16F 5/00 248/324 |
| 3,731,897 | A | | 5/1973 | Price |

(Continued)

FOREIGN PATENT DOCUMENTS

| | | |
|---|---|---|
| CN | 202228878 U | 5/2012 |
| CN | 202327583 U | 7/2012 |

(Continued)

OTHER PUBLICATIONS

"U.S. Appl. No. 14/477,158, Non Final Office Action mailed Sep. 11, 2015", 16 pgs.

(Continued)

*Primary Examiner* — Alfred J Wujciak
(74) *Attorney, Agent, or Firm* — Schwegman Lundberg & Woessner, P.A.

(57) ABSTRACT

A mounting system for a projector includes a stationary body and a gimbal assembly to connect to a projector. The mounting system further includes a first support having a first end connected to the stationary body and a second end connected to the gimbal assembly, a second support having a first end connected to the stationary body and a second end connected to the gimbal assembly, and a third support having a first end connected to the stationary body and a second end connected to the gimbal assembly. A length of the first, second, and third supports are adjustable independent of the length of the other of the first, second, and third supports to adjust a tilt angle and a roll angle of a projector connected to the gimbal with respect to the stationary body.

26 Claims, 9 Drawing Sheets

(51) Int. Cl.
*F21V 21/03* (2006.01)
*E04B 9/00* (2006.01)

(56) References Cited

U.S. PATENT DOCUMENTS

| | | | |
|---|---|---|---|
| D302,697 S | 8/1989 | Parrish | |
| 5,037,267 A * | 8/1991 | Warner | B25J 5/02 |
| | | | 248/324 |
| 5,181,686 A | 1/1993 | Barthel | |
| 5,271,592 A * | 12/1993 | Ludwig | F16M 11/043 |
| | | | 248/333 |
| 5,312,121 A | 5/1994 | Chapman | |
| 6,121,737 A * | 9/2000 | Guenther | E04B 9/006 |
| | | | 248/320 |
| 6,485,144 B1 | 11/2002 | Liao | |
| 6,691,965 B1 | 2/2004 | Lin | |
| 7,190,586 B2 | 3/2007 | Franz et al. | |
| 7,301,774 B2 | 11/2007 | Lee et al. | |
| D560,669 S | 1/2008 | Muday et al. | |
| 7,891,624 B2 | 2/2011 | Dittmer et al. | |
| 7,969,742 B2 | 6/2011 | Liu | |
| 8,221,399 B2 * | 7/2012 | Amano | A61F 9/008 |
| | | | 351/208 |
| 8,345,154 B2 | 1/2013 | Zhan | |
| 9,004,430 B2 * | 4/2015 | Conner | F16M 11/08 |
| | | | 248/277.1 |
| 2003/0234335 A1 | 12/2003 | Umberg | |
| 2005/0161575 A1 | 7/2005 | Friederich et al. | |
| 2005/0236546 A1 | 10/2005 | O'Neill | |
| 2006/0061738 A1 | 3/2006 | Rizzo | |
| 2006/0186301 A1 | 8/2006 | Dozier et al. | |
| 2006/0261227 A1 | 11/2006 | Petrick et al. | |
| 2007/0034765 A1 | 2/2007 | Lo | |
| 2008/0061200 A1 | 3/2008 | Bouissiere | |
| 2009/0294619 A1 | 12/2009 | David | |
| 2009/0316118 A1 | 12/2009 | Dittmer | |
| 2010/0237210 A1 | 9/2010 | Anderson et al. | |
| 2011/0297809 A1 | 12/2011 | Bouissiere et al. | |
| 2012/0320596 A1 | 12/2012 | Hastings | |
| 2013/0048819 A1 | 2/2013 | Hung | |
| 2015/0060625 A1 | 3/2015 | Runger | |

FOREIGN PATENT DOCUMENTS

| | | |
|---|---|---|
| EP | 1852646 A2 | 11/2007 |
| WO | WO-2014/160011 A1 | 10/2014 |
| WO | WO-2015/035009 A1 | 3/2015 |

OTHER PUBLICATIONS

"International Application Serial No. PCT/US2014/025624, International Preliminary Report on Patentability mailed Sep. 24, 2015", 8 pgs.

"International Application Serial No. PCT/US2014/054035, International Search Report mailed Feb. 13, 2015", 5 pgs.

"International Application Serial No. PCT/US2014/054035, Written Opinion mailed Feb. 13, 2015", 4 pgs.

"International Application Serial No. PCT/US2014/025624, International Search Report mailed Aug. 22, 2014", 5 pgs.

"International Application Serial No. PCT/US2014/025624, Written Opinion mailed Aug. 22, 2014", 6 pgs.

"U.S. Appl. No. 14/477,158, Response filed Dec. 9, 2015 to Non Final Office Action mailed Sep. 11, 2015", 13 pgs.

"U.S. Appl. No. 14/477,158, Notice of Allowance mailed Apr. 6, 2016", 10 pgs.

\* cited by examiner

PROJECTOR MOUNT SYSTEM AND METHOD

CLAIM OF PRIORITY

This application claims the benefit of priority under 35 U.S.C. §119(e) of U.S. Provisional Patent Application Ser. No. 61/778,712, filed on Mar. 13, 2013, and U.S. Provisional Patent Application Ser. No. 61/840,077, filed on Jun. 27, 2013, which are both herein incorporated by reference in their entirety.

FIELD

This invention generally relates to system methods for mounting electronic devices.

BACKGROUND

Electronic projectors are generally devices used to project an image onto a vertical surface, such as a screen or wall. They are often hung from ceilings or placed on a support surface such as a desk.

SUMMARY

Embodiments of the invention include a mounting system for a projector. In some embodiments, the mounting system includes a stationary body and a gimbal assembly to connect to a projector. In certain embodiments, the mounting system includes a plurality of supports connected to the stationary body and the gimbal assembly. In some embodiments, the lengths of the supports are independently adjustable to adjust a tilt angle and a roll angle of a projector connected to the gimbal with respect to the stationary body.

In another embodiment, the mounting system includes a stationary body and a frame to connect to a projector. In some embodiments, the mounting system includes a plurality of supports and at least one pivotable connector connected to the stationary body and the frame. In some embodiments, the lengths of the supports are independently adjustable to adjust a tilt angle and a roll angle of a projector connected to the frame with respect to the stationary body. In certain embodiments, the pivotable connectors prevent movement about a yaw axis of the frame relative to the stationary body, and are configured such that their lengths can change in order to accommodate the tilt and/or roll adjustments of the frame.

Embodiments of the invention also include methods of using such mounting systems.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
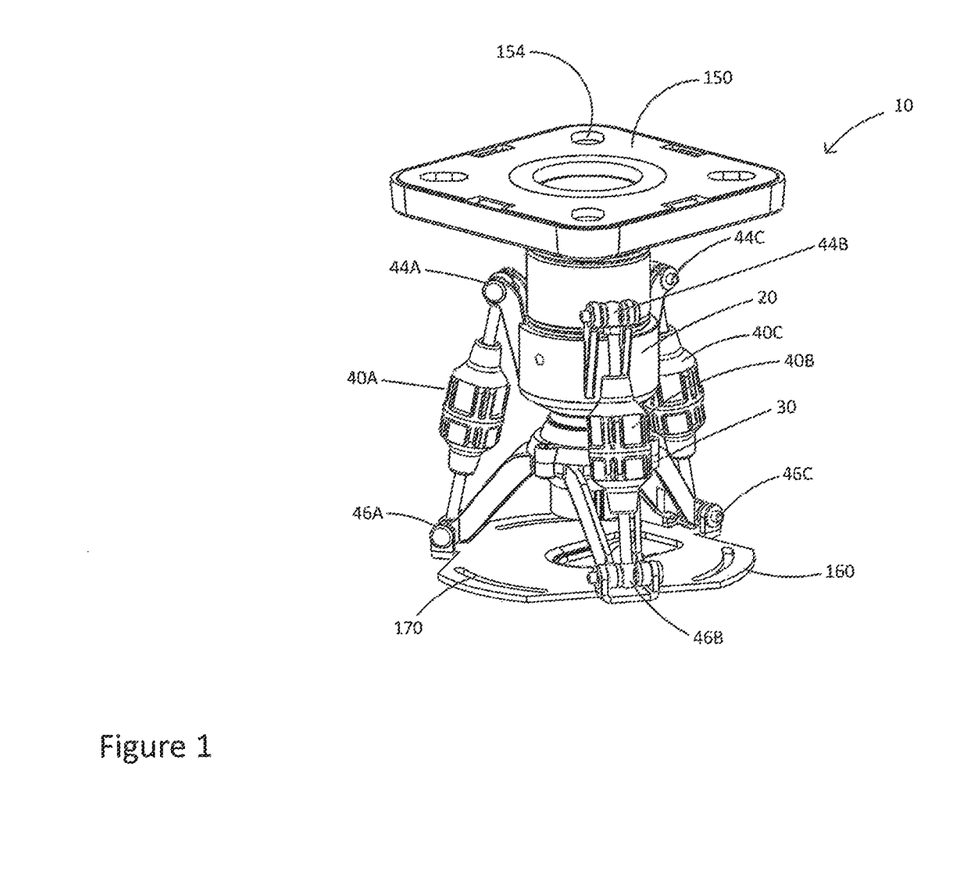
FIG. 1 is a perspective view of a mounting system 1 accordance with an embodiment of the invention.

FIG. 1 is a perspective view of a mounting system 10 for a projector in accordance with an embodiment of the invention. In some embodiments, the mounting system 10 allows for fine adjustments of the tilt and roll angle of the projector to desirably align an image projected from the projector with a vertical surface such as a screen. References to tilt, roll, and yaw angles herein will refer to the directional movements depicted in FIG. 2 (note that tilt and roll are symmetrical and therefor interchangeable for purposes of this disclosure).

As shown in FIG. 1, embodiments of the mounting system 10 can include a stationary body 20 and a gimbal assembly 30 to connect to a projector. The stationary body 20 and the gimbal assembly 30 can be connected to each other via a plurality of supports 40A,B,C. As shown, the mounting system 10 can include a first support 40A having a first end 44A connected to the stationary body 20 and a second end 46A connected to the gimbal assembly 30, a second support 40B having a first end 44B connected to the stationary body 20 and a second end 46B connected to the gimbal assembly 30, and a third support 40C having a first end 44C connected to the stationary body 20 and a second end 46C connected to the gimbal assembly 30. In some embodiments, a length of the first, second, and third supports 40A,B,C is adjustable independently of the length of the other of the first, second, and third supports 40A,B,C. Accordingly, such a system is useful for adjusting a tilt angle and a roll angle of a projector connected to the gimbal assembly 30 with respect to the stationary body 20.

Figure 2:
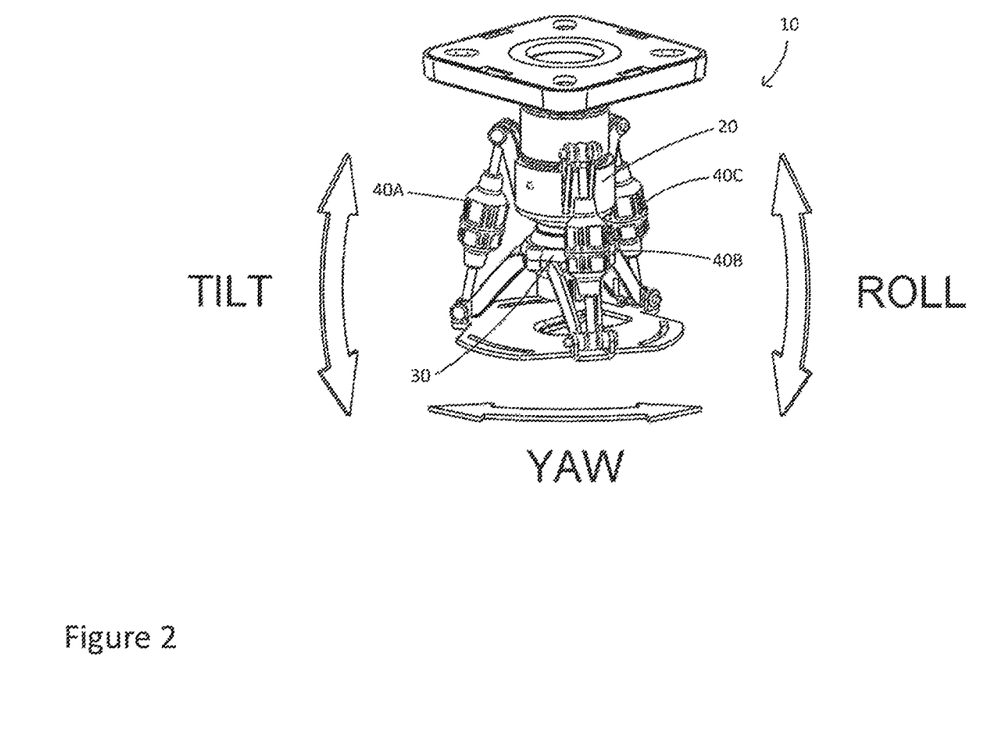
FIG. 2 is a perspective view of a mounting system in accordance with an embodiment of the invention depicting certain angles.
Figure 3:
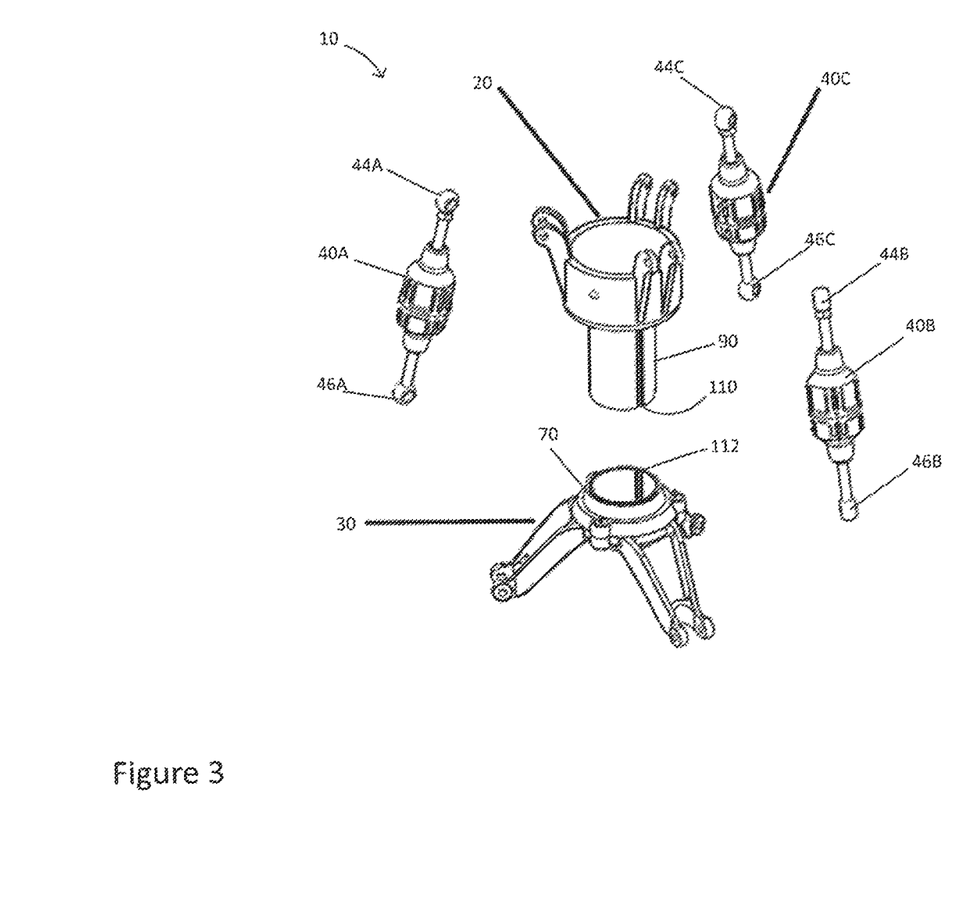
FIG. 3 is an exploded perspective view of a mounting system in accordance with an embodiment of the invention.

The supports 40 can assume any useful orientation. In some embodiments, as shown in FIGS. 1-3, the first, second, and third supports 40A,B,C are located equidistantly about a circumference of the mounting system 10. In certain embodiments, again as shown in FIGS. 1-3, the stationary body 20 has a generally vertical longitudinal axis and the first, second, and third supports 40A,B,C each have a longitudinal axis, and the longitudinal axes of the first, second, and third supports 40A,B,C are skewed relative the generally vertical longitudinal axis.

As shown in FIGS. 1-3, in some embodiments the first end 44 of each support 40 is pivotably connected to the stationary body 20 to allow pivoting of the first end of the support relative to the stationary body 20 about a generally horizontal axis. In certain embodiments, the second end 46 of each support 40 is pivotably connected to the gimbal assembly 30 to allow pivoting of the second end of the support relative to the gimbal assembly 30 about a generally horizontal axis. Such pivotable connections can include a rivet or a bolt.

Figure 4:
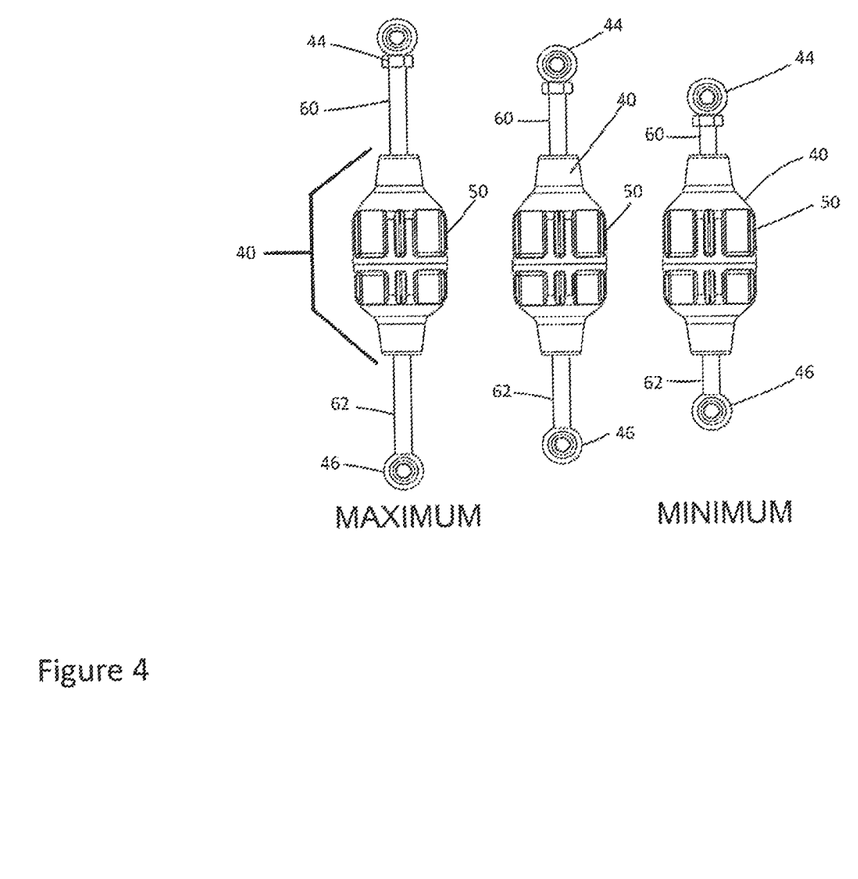
FIG. 4 is a side plan view of a support adjusted to a first length in accordance with an embodiment of the invention, and the support adjusted to a second length, and the support adjusted to a third length.

The length of the supports 40 can be adjusted by any suitable method. FIGS. 4A-C depict a support 40 adjusted to assume three different respective lengths. In some embodiments, the length of the supports 40 can be infinitely adjusted between the minimum and the maximum lengths provided by the support. In some embodiments, the length of the supports 40 adjusts in a linear path by rotating a dial 50. In such embodiments, the dial 50 may be threadingly engaged with first and second legs 60, 62, such that rotation of the dial linearly extends or retracts the first and second legs from the dial. In certain embodiments, the supports 40 include a turnbuckle.

Figure 5:
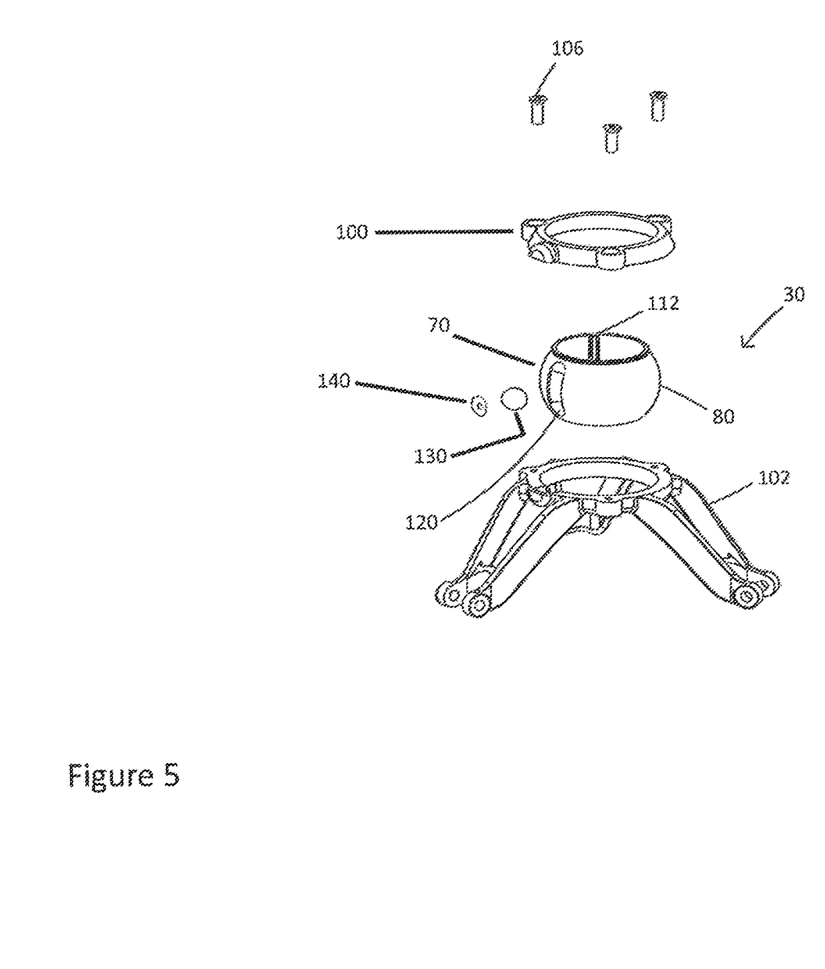
FIG. 5 is an exploded perspective view of a gimbal assembly in accordance with an embodiment of the invention.
Figure 6:
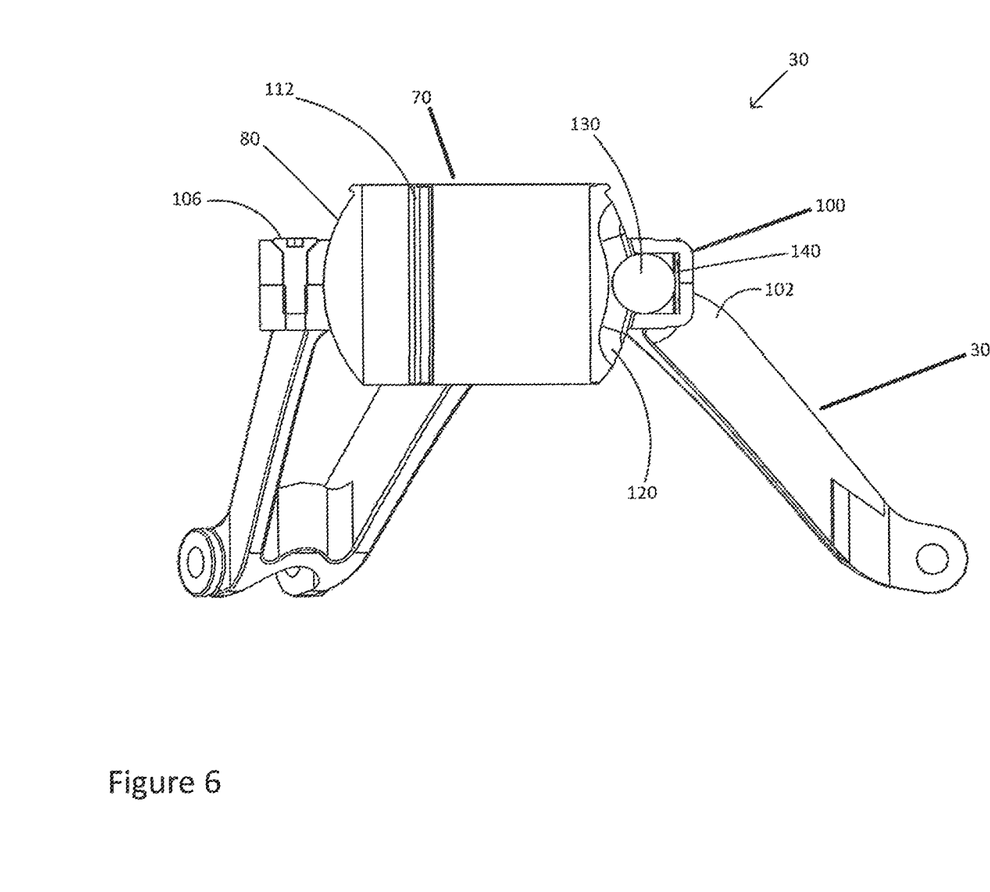
FIG. 6 is a side cut-away view of a gimbal assembly in accordance with an embodiment of the invention.

As shown in FIGS. 5-6, in some embodiments the stationary body 20 and gimbal assembly 30 are further connected by a guide member 70. In certain embodiments, the guide member 70 has a generally spherical outer surface 80. The guide member 70 can provide support to the connection yet allow desired tilt and roll angle adjustments. In some embodiments, the stationary body 20 has a generally cylindrical member 90 (FIG. 3) extending into an interior of the guide member 70 and the gimbal assembly 30 is in apposition to the generally spherical outer surface 80. As shown, the gimbal assembly 30 can include a first portion 100 and a second portion 102 connected (e.g., with fasteners 106) about the guide member 70 to retain it.

In some embodiments, the guide member 70 is keyed against rotation with respect to the cylindrical member 90. For example, the cylindrical member can include splines 110 along an exterior surface to interact with splines 112 on the interior surface of the guide member to key the guide against rotation, as shown in FIG. 3.

Returning to FIGS. 5-6, in some embodiments the guide includes a groove 120 along its generally spherical outer surface, the groove 120 sized to receive a ball 130 carried by the gimbal assembly 30. A spring 140 can be used to bias the ball into the groove 120. Such a system prevents undesired yaw angle adjustments during desired tilt and roll angle adjustments. Accordingly, in some embodiments, the mounting system 10 is configured to only allow for tilt and roll angle adjustments and vertical adjustments, and resists other adjustments.

The stationary body 20 may be configured to rest on a horizontal support surface or to be attached to a ceiling. In some embodiments, as shown in FIG. 1, a first plate 150 is connected to the stationary body 20 and configured to be in apposition to a generally horizontal support surface. In certain embodiments, the first plate is configured to be attached to a ceiling. In some embodiments, it can include on or more apertures 154 for receiving a fastener.

The gimbal assembly 30 can be configured to connect to the projector in any suitable fashion. In some embodiments, such as shown in FIG. 1, the gimbal assembly 30 includes a second plate 160 configured to connect to a projector. As shown, the second plate can include one or more plate slots 170 to adjustably connect to a projector with a fastener.

Embodiments of the invention also include methods of using mounting systems. In some embodiments, the method can include the step of providing a mounting system for a projector having a stationary body and a gimbal assembly connected by a plurality of supports having independently adjustable lengths, and adjusting a length of at least one support to change the tilt or roll angle of the mounting system.

Figure 7:
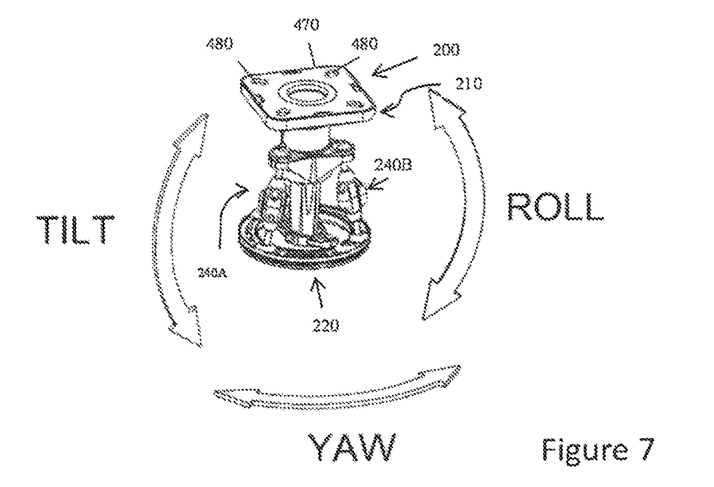
FIG. 7 is a perspective view of a mounting system in accordance with another embodiment of the invention depicting certain angles.

FIG. 7 is a perspective view of a mounting system 200 for a projector in accordance with another embodiment of the invention. In some embodiments, the mounting system 200 limits movement about a yaw axis and allows for fine adjustments of the tilt and roll angle of the projector to desirably align an image projected from the projector with a vertical surface such as a screen. In certain embodiments, the mounting system 200 permits a small amount of travel in the vertical direction. References to tilt, roll, and yaw angles for the mounting system 200 will refer to the directional movements depicted in FIG. 7 (note that tilt and roll are symmetrical and therefor interchangeable for purposes of this disclosure)

Figure 8:
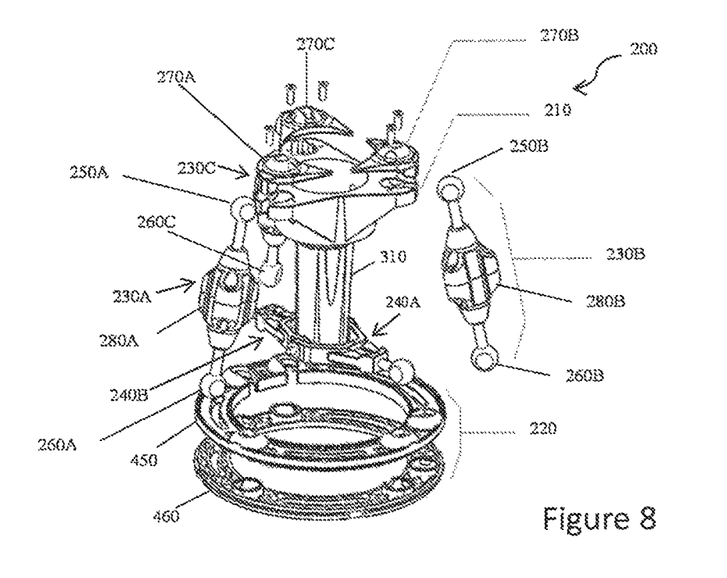
FIG. 8 is a perspective view of the mounting system of FIG. 7 in a dis-assembled state.

As shown in FIG. 8, embodiments of the mounting system 200 can include a stationary body 210 and a frame 220 to connect to a projector. The stationary body 210 and the frame 220 can be connected to each other via a plurality of supports 230A,B,C and at least one, such as two, pivotable connectors 240A,B. As shown, the mounting system 200 can include a first support 230A having a first end 250A connected to the stationary body 210 and a second end 260A connected to the frame 220, a second support 230B having a first end 250B connected to the stationary body 210 and a second end 260B connected to the frame 220, a third support 230C having a first end (not visible) connected to the stationary body 210 and a second end 260C connected to the frame 220, a first pivotable connector 240A between the stationary body 210 and the frame 220, and a second pivotable connector 240B between the stationary body 210 and the frame 220. Although not visible, the first end of the third support 230C is substantially similar to the first ends 250A,B of the supports 230A,B.

In some embodiments, a length of the first, second, and third supports 230A,B,C is adjustable independently of the length of the other of the first, second, and third supports 230A,B,C. In certain embodiments, the stationary body 210 can be retained in a fixed position while frame 220 can be rolled and/or tilted relative to the fixed stationary body 210. Accordingly, such a system is useful for adjusting a tilt angle and a roll angle of a projector connected to the frame 220 with respect to the stationary body 210. In certain embodiments, the first and second pivotable connectors 240A,B are configured to limit and/or inhibit yaw movement of the frame 220 with respect to the stationary body 210. Accordingly, the movement about the yaw axis of the projector connected to the frame 220 is limited and/or inhibited with respect to the stationary body 210. In some embodiments, each pivotable connector 240 is configured such that its length changes so as to accommodate the tilt and roll of the frame 220 with respect to the stationary body 210.

Figure 10:
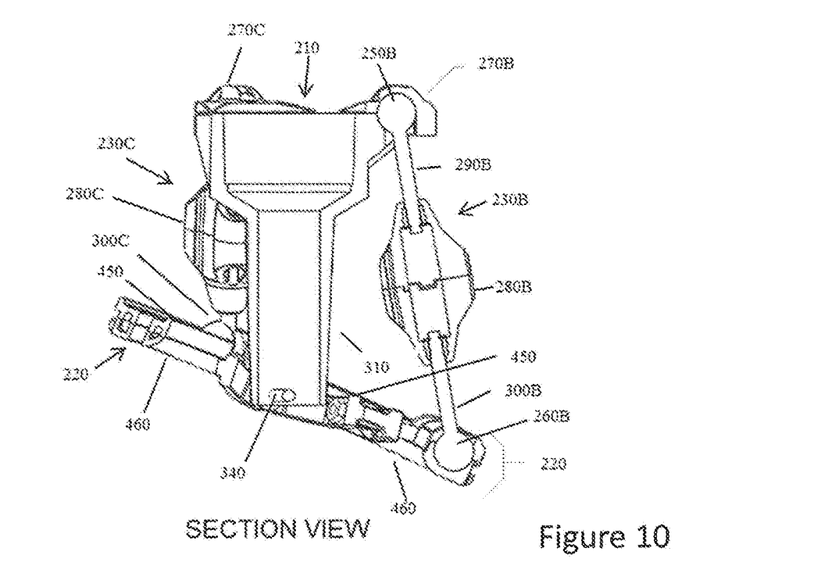
FIG. 10 is a cross-sectional view of the mounting system of FIG. 7.

The supports 230 can assume any useful orientation. In some embodiments, as shown in FIGS. 7, 8 and 10, the first, second, and third supports 230A,B,C are located equidistantly about a perimeter of the mounting system 200. In certain embodiments, again as shown in FIGS. 7, 8 and 10, the stationary body 210 has a generally vertical longitudinal axis and the first, second, and third supports 230A,B,C each have a longitudinal axis, and the longitudinal axes of the first, second, and third supports 230A,B,C are skewed relative the generally vertical longitudinal axis.

In the interest of clarity and simplicity, a description and illustration of the connections of all the supports 230A,B,C to both the stationary body 210 and the frame 220 are not included. What is included is an exemplary description of the connections, as illustrated in FIG. 10, between the stationary body 210 and the support 230B, and between the frame 220 and the support 230B. It should be appreciated that the connection of the supports 230A,C to the stationary body 210 and the frame 220, although not shown or described, will be substantially similar to the following description of the connection of the support 230B to the stationary body 210 and the frame 220.

As shown in FIG. 10, the first end 250B of the support 230B is pivotably connected to the stationary body 210 to allow pivoting of the first end 250B of the support 230B relative to the stationary body 210 about a generally horizontal axis. In certain embodiments, the first end 250B of the support 230B is secured to the stationary body 210 by a cap 270B. (Although not shown, cap 270A is similarly used for securing the first end 250A of the support 230A to the stationary body 210.) In some embodiments, the second end 260B of each support 230B is pivotably connected to the frame 220 to allow pivoting of the second end 260B of the support 230B relative to the frame 220 about a generally horizontal axis. In certain embodiments, the second end 260B of each support 230B is pivotably connected to the frame 220 by encasing the second end 260B in the frame 220.

Figure 9A:
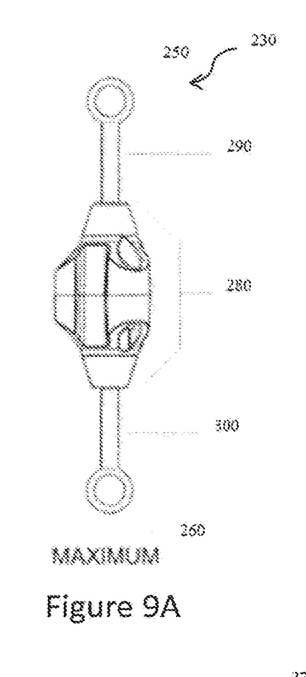
FIG. 9A is a side plan view of a support adjusted to a first length in accordance with an embodiment of the invention.
Figure 9B:
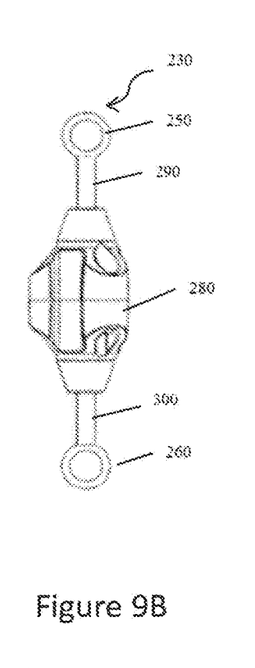
FIG. 9B is a side plan view of a support adjusted to a second length in accordance with an embodiment of the invention.
Figure 9C:
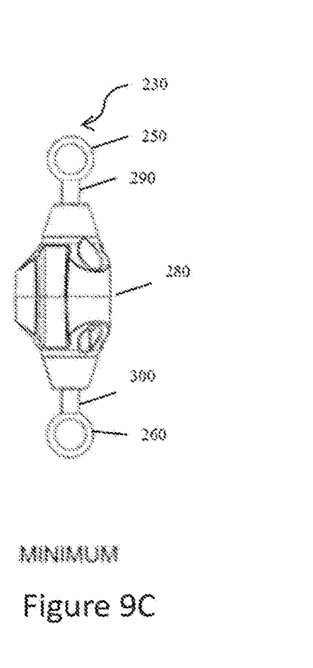
FIG. 9C is a side plan view of a support adjusted to a third length in accordance with an embodiment of the invention.

The length of the supports 230 can be adjusted by any suitable method. FIGS. 9A-C depict a support 230 adjusted to assume three different respective lengths. In some embodiments, the length of the supports 230 can be infinitely adjusted between the minimum and the maximum lengths provided by the support 230. In some embodiments, the length of the supports 230 adjusts in a linear path by rotating a dial 280. In such embodiments, the dial 280 may be threadingly engaged with first and second legs 290, 300, such that rotation of the dial 280 linearly extends or retracts the first and second legs 290, 300 from the dial 280. In certain embodiments, the first and second legs 290 and 300 include threaded shanks having threads in a direction opposite each other. The threaded shanks extend into the dial 280 such that when the dial 280 is rotated, both the first and second legs 290 and 300 extend or retract in unison. In some embodiments, when all the supports 230 are of equal length, the frame 220 is substantially parallel to the top of the stationary body 210. Adjusting the length of any one or more of the supports 230 will change the tilt and/or roll angle of the frame 220 proportional to the magnitude of the change in the length. In certain embodiments, the supports 230 include a turnbuckle. In some embodiments, the supports 230 are load bearing supports.

Figure 11:
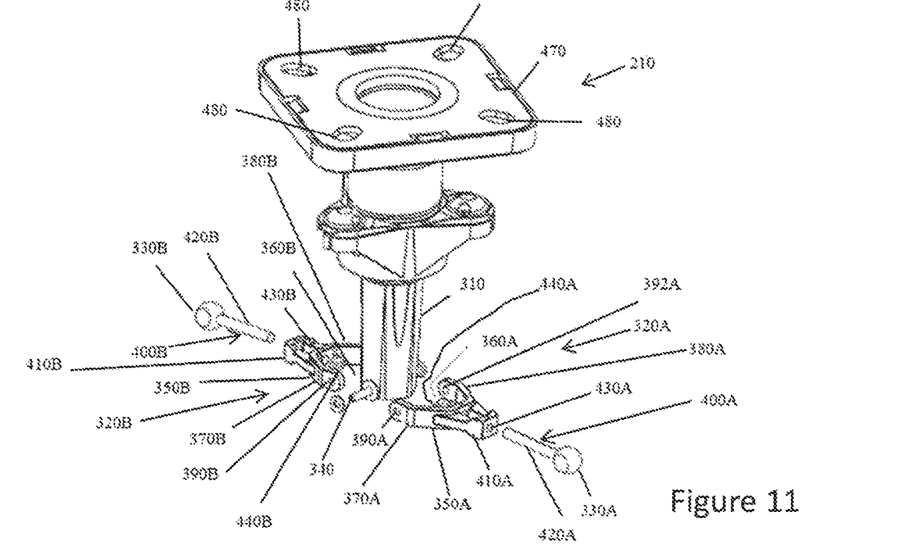
FIG. 11 is a perspective view of a portion of the mounting system of FIG. 7 in a dis-assembled state.

In some embodiments, as shown in FIG. 11, the mounting system 200 includes a connector 310 extending from the stationary body 210. In certain embodiments, the connector 310 is a protrusion extending from the stationary body 210. In some embodiments, the connector 310 is configured for supporting a lateral force.

In certain embodiments, the first pivotable connector 240A has a first end 320A connected to the connector 310 and a second end 330A connected to the frame 220, and the second pivotable connector 240B has a first end 320B connected to the connector 310 and a second end 330B connected to the frame 220. In some embodiments, the first ends 320 of each pivotable connector 240 are pivotably connected to the connector 310. In certain embodiments, one or more lateral extensions (e.g., rivets) 340 extending laterally from the connector 310 can be used for connecting the first ends 320 of each pivotable connector 240 to the connector 310 in a manner such that each pivotable connector 240 can pivot independently about the extensions 340. In some embodiments, the second ends 330 of each pivotable connector 240 are pivotably connected to the frame 220. In certain embodiments, the second end 330 of each pivotable connector 240 is pivotably connected to the frame 220 by encasing the second end 330 in the frame 220.

Figure 12:
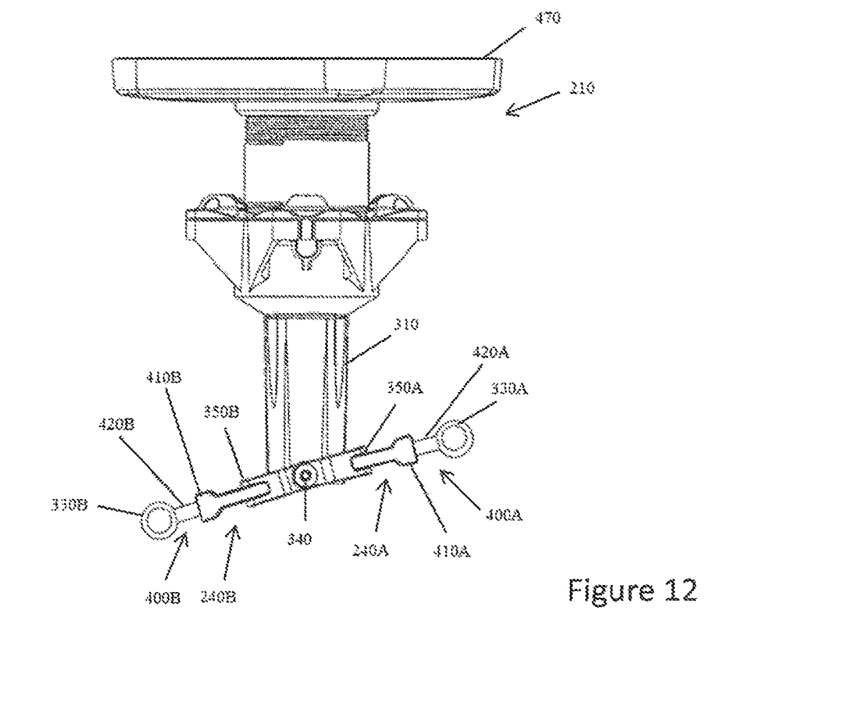
FIG. 12 is a cross-sectional view of the mounting system of FIG. 11 in an assembled state.

In some embodiments, the first ends 320A,B of the pivotable connectors 240A,B include a Y-link 350A,B having an opening 360A,B. Each opening 360A,B is defined at least in part by first and second sides 370A,B and 380A,B of the Y-links 350A,B arranged in an opposed spaced apart relationship with each other. In some embodiments, the first sides 370A,B of the Y-links 350A,B respectively include apertures 390A,B for connecting the first sides 370A,B of the Y-links 350A,B to the connector 310. Similarly, the second sides 380A,B of the Y-links 350A,B respectively include apertures for connecting the second sides 380A,B of the Y-links 350A,B to the connector 310. In FIG. 11, it should be noted that only aperture 392A in the second side 380A of the Y-link 350A is visible, and that the aperture in the second side 380B of the Y-link 350B is not visible. As shown in FIGS. 8 and 12, at least a portion of the connector 310 can extend through the openings 360A,B in the Y-links 350A,B of the pivotable connectors 240A,B.

In certain embodiments, at least one of the first and second sides 370 and 380 of at least one of the pivotable connector 240 is connected to the connector 310. In some embodiments, two or more of the first and/or seconds sides 370 and 380 of one and/or both pivotable connector 240 are connected to the connector 310. In certain embodiments, the first and second sides 370 and 380 of the pivotable connector 240 are pivotal connected to the connector 310. In some embodiments, a lateral extension 340 extending through the aperture 390 can be used for pivotably connecting the first and second sides 370 and 380 of the pivotable connector 240 to opposing sides of the connector 310. Thus, the first end 320A,B of the pivotable connector 240A,B is considered a pivotable end defined by the opposed first and second sides 370A,B of the Y-link 350A,B. As can be seen, by attaching the Y-link 350 to the connector 310, yaw movement (or rotation) of the pivotable connectors 240 with respect to the stationary body 210 is limited. Accordingly, yaw movement of the frame 220 to which the second end 330 of the pivotable connector 240 is connected is also limited. As such, the Y-link 350 is an anti-rotation system for the frame 220, generally limiting rotation about a yaw axis (e.g., a generally vertical axis).

In some embodiments, the pivotable connectors 240 are configured such that a length of the first and second pivotable connector 240A,B can change independently of the length of the other of the first and second pivotable connector 240A,B. Accordingly, the length of each of the first and second pivotable connector 240A,B changes to accommodate the tilt and roll of the frame 220 with respect to the stationary body 210.

In some embodiments, the pivotable connectors 240A,B can include Y-links 350A,B and shanks 400A,B. As shown in FIG. 11, and as previously described, the pivotable ends of the Y-links 350A,B as defined at least in part by the first and second sides 370A,B and 380A,B define at least a portion of the first ends 320A,B of the pivotable connectors 240A,B. Accordingly, in some embodiments, the first end 320A,B of the pivotable connector 240A,B, which is also the pivotable end of the Y-link 350A,B, is pivotally connected to the connector 310. In addition, each Y-link 350A,B can include a sliding section 410A,B. Also as shown, a pivotable end of the shank 400A,B defines at least a portion of the second end 330A,B of the pivotable connector 240A,B. In certain embodiments, the second end 330A,B of the pivotable connector 240A,B, which is also the pivotable end of the shank 400A,B, can be pivotably connected to the frame 220. In addition, each shank 400A,B can include a sliding section 420A,B. In some embodiments, the sliding section 410A,B of the Y-link 350A,B and the sliding section 420A,B of the shank 400A,B are configured for sliding engagement with each other such that a length of the pivotable connector 240A,B is changeable in response to the tilt and roll movement of the frame 220.

In some embodiments, the sliding section 410 of the Y-link 350 is configured for slideable engagement with the sliding section 420 of the shank 400. In certain embodiments, the sliding section 410A,B of the Y-link 350A,B includes one or more apertures 430A,B configured for slideably receiving the sliding section 420A,B of the shank 400A,B. As such, the sliding section 420A,B of the shank 400A,B extends through the aperture 430A,B in the sliding section 410A,B of the Y-link 350A,B. Accordingly, the length of the pivotable connector 240A,B can change as the sliding section 420A,B of the shank 400A,B extends and slides through the aperture 430A,B in the sliding section 410A,B of the Y-link 350A,B.

In certain embodiments, the sliding section 420A,B of the shank 400A,B includes a jam-nut 440A,B around a threaded portion of the shank 400A,B opposite the pivotable end of the shank 400A,B which, as previously described, is also the second end 330A,B of the pivotable connector 240A,B. In some embodiments, the jam-nut 440A,B inhibits dislodgement of the sliding section 420A,B of the shank 400A,B from the sliding section 410A,B of the Y-link 350A,B. Accordingly, separation of the Y-link 350A,B and the shank 400A,B from each other is inhibited or prevented. In certain embodiments, the length of the sliding section 420A,B of the shank 400A,B extending through the jam-nut 440A,B is adjustable for limiting the distance traveled by the shank 400A,B through the aperture 430A,B in the sliding section 410A,B of the Y-link 350A,B.

In some embodiments, the frame 220 can include opposing first and second plates 450 and 460 configured for encapsulating the second ends 260A,B,C of each support 230A,B,C and the second ends 330A,B of each pivotable connector 240A,B between the first and second plates 450 and 460. FIG. 10 shows the second end 260B of the support 230B encased between the first and second plates 450 and 460 and pivotably connected to the frame 220. In certain embodiments, the second plate 460 is configured to connect to the projector. In general, the frame 220 can be configured to connect to the projector in any suitable fashion. It should be noted that although not shown in FIG. 10, the second ends 260A,C of the supports 230A,C are similarly encased as second end 260B of support 230B is between the first and second plates 450 and 460 and pivotably connected to the frame 220.

In some embodiments, the stationary body 210 may be configured to rest on a horizontal support surface or to be attached to a ceiling. In certain embodiments, as shown in FIGS. 7, 11 and 12, a first plate 470 is connected to the stationary body 210 and configured to be in apposition to a generally horizontal support surface. In some embodiments, the first plate 470 is configured to be attached to a ceiling. In certain embodiments, the first plate 470 can include on or more apertures 480 for receiving a fastener.

Embodiments of the invention also include methods of using the mounting systems. In some embodiments, the method can include the step of providing the mounting system having the stationary body and the frame to which a projector is attached. The stationary body and the frame are connected to each other by a plurality of supports having independently adjustable lengths and a plurality of pivotable connectors. The tilt and/or roll of the projector attached to the frame can be changed relative to the stationary body by adjusting a length of at least one support. The pivotable connectors limit the yaw movement (or the rotation about the yaw axis) of the frame relative to the stationary body, and are configured such that their lengths can change independently of each other for accommodating the tilt and/or roll adjustments of the frame.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A mounting system for a projector, comprising:
a stationary body;
a frame to connect to a projector;
a first support having a first end connected to the stationary body and a second end connected to the frame;
a second support having a first end connected to the stationary body and a second end connected to the frame;
a third support having a first end connected to the stationary body and a second end connected to the frame;
a length of the first, second, and third supports being adjustable independent of the length of the other of the first, second, and third supports to adjust a tilt angle and a roll angle of the projector connected to the frame with respect to the stationary body;
a first pivotable connector between the stationary body and the frame; and
a second pivotable connector between the stationary body and the frame;
wherein the first and second pivotable connectors are configured to limit a rotation of the frame with respect to the stationary body, and wherein the length of the first, second, and third supports adjusts in a linear path by rotating a dial.

2. The mounting system of claim 1, further comprising a plate connected to the stationary body and configured to be in apposition to a generally horizontal support surface.

3. The mounting system of claim 2, wherein the plate is configured to be attached to a ceiling.

4. The mounting system of claim 1, wherein the first, second, and third supports are located equidistantly about a perimeter of the mounting system.

5. The mounting system of claim 1, wherein the stationary body has a generally vertical longitudinal axis and the first, second, and third supports each have a longitudinal axis, the longitudinal axes of the first, second, and third supports each being skewed relative the generally vertical longitudinal axis.

6. The mounting system of claim 1, wherein the first, second, and third supports include a turnbuckle.

7. The mounting system of claim 1, wherein the first end of each support is pivotably connected to the stationary body to allow pivoting of the first end of the support relative to the stationary body about a generally horizontal axis.

8. The mounting system of claim 1, wherein the second end of each support is pivotably connected to the frame to allow pivoting of the second end of the support relative to the frame about a generally horizontal axis.

9. The mounting system of claim 8, wherein
the stationary body has a connector extending therefrom;
the first pivotable connector has a first end connected to the connector and a second end connected to the frame; and
the second pivotable connector has a first end connected to the connector and a second end connected to the frame.

10. The mounting system of claim 9, wherein the first end of each pivotable connector is pivotably connected to the connector.

11. The mounting system of claim 10, wherein the first end of at least one of the first and second pivotable connector is a Y-link comprising an opening defined at least in part by a first side and a second side, wherein the first and second sides are in an opposed spaced apart relationship with each other.

12. The mounting system of claim 11, wherein at least one of the first and second sides of the Y-link of the at least one pivotable connector is pivotably connected to the connector.

13. The mounting system of claim 11, wherein
at least a portion of the connector extends through the opening of the Y-link of the at least one pivotable connector; and
at least a portion of the first and second sides of the Y-link are pivotably connected to opposing sides of the connector.

14. The mounting system of claim 9, wherein the second end of each pivotable connector is pivotably connected to the frame.

15. The mounting system of claim 14, wherein the frame includes opposing first and second plates configured for encapsulating the second end of each support and the second end of each pivotable connector therebetween.

16. The mounting system of claim 15, wherein the second plate is configured to connect to the projector.

17. The mounting system of claim 9, wherein the connector is a protrusion.

18. The mounting system of claim 1, wherein a length of at least one of the first and second pivotable connectors is adjustable.

19. The mounting system of claim 1, wherein at least one of the first and second pivotable connector comprises a Y-link and a shank, the Y-link and the shank configured for sliding engagement with each other such that a length of the at least one pivotable connector is adjustable.

20. The mounting system of claim 19, wherein
the Y-link comprises a pivotable end and a sliding section, the pivotable end defining at least a portion of the first end of the at least one pivotable connector;
the shank comprises a sliding section and a pivotable end, the pivotable end defining at least a portion of the second end of the at least one pivotable connector; and
the sliding section of the Y-link and the sliding section of the shank are in sliding engagement with each other such that the length of the at least one pivotable connector is adjustable.

21. The mounting system of claim 20, wherein
at least a portion of the pivotable end of the Y-link is pivotably connected to the connector; and
at least a portion of the pivotable end of the shank is pivotably connected to the frame.

22. The mounting system of claim 21, wherein the frame includes opposing first and second plates configured for encapsulating the second end of each support and the pivotable end of the shank there between.

23. The mounting system of claim 20, wherein
the sliding section of the shank extends through one or more apertures in the sliding section of the Y-link; and
the sliding section includes a jam-nut around a threaded portion of the shank opposite the pivotable end of the shank.

24. The mounting system of claim 23, wherein the jam-nut inhibits dislodgement of the sliding section of the shank from the sliding, section of the Y-link thereby inhibiting a separation of the shank and the Y-link from each other.

25. The mounting system of claim 23, wherein a length of the shank extending through the jam-nut is adjustable for limiting a distance the shank slides relative to the Y-link.

26. The mounting system of claim 1, wherein the first and second pivotable connectors limit movement about a yaw axis of the frame with respect to the stationary body.

* * * * *